United States Patent [19]
Dvorsky et al.

[11] Patent Number: 6,107,927
[45] Date of Patent: Aug. 22, 2000

[54] GENERATOR SET CONTROLLER WITH INTEGRAL SYNCHROSCOPE MODE

[75] Inventors: Michael A. Dvorsky; Darren L. Krahn; Sekar Srinivasan, all of Peoria, Ill.; Siva Subramaniam, Erie, Pa.

[73] Assignee: Caterpillar Inc., Peoria, Ill.

[21] Appl. No.: 09/209,027

[22] Filed: Dec. 10, 1998

[51] Int. Cl.$^7$ .................................................. G08B 21/00
[52] U.S. Cl. ........................ 340/658; 340/661; 290/1 R; 290/40 C; 318/705
[58] Field of Search ................................ 340/658, 661, 340/657, 815.44, 815.58; 307/87, 86; 290/1 R, 40 C, 40 R, 40 B; 318/85, 705, 437, 446, 479, 490; 361/20, 21

[56] References Cited

U.S. PATENT DOCUMENTS

| | | | |
|---|---|---|---|
| 4,031,407 | 6/1977 | Reed | 307/87 |
| 5,390,068 | 2/1995 | Schultz et al. | 361/95 |
| 5,977,646 | 11/1999 | Lenz et al. | 290/40 C |

Primary Examiner—Daniel J. Wu
Assistant Examiner—Sihong Huang
Attorney, Agent, or Firm—R. Carl Wilbur

[57] ABSTRACT

A generator set controller verifies the status of a synchroscope mode selector to determine whether the generator set controller is operating in a synchroscope mode. When operating in a synchroscope mode, the generator set controller uses an existing display panel to create an indication of the difference between the phase of the power on a power bus and the phase of the power output of the generator.

8 Claims, 2 Drawing Sheets

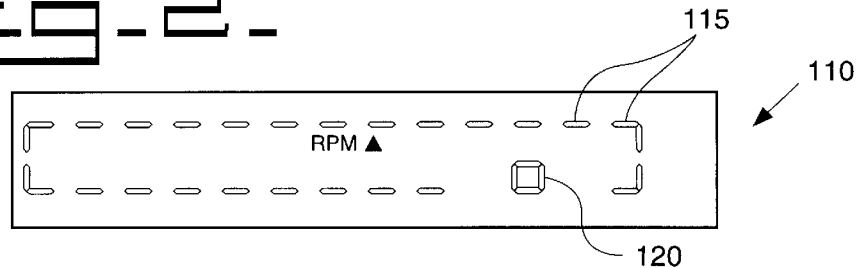
Fig-2-
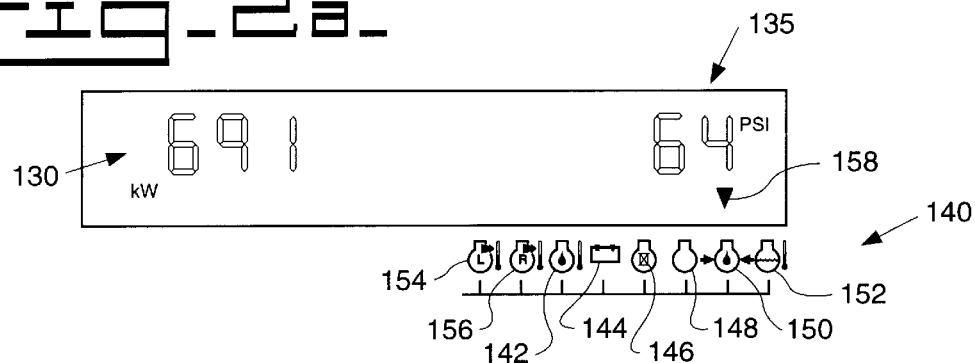
Fig-2a-
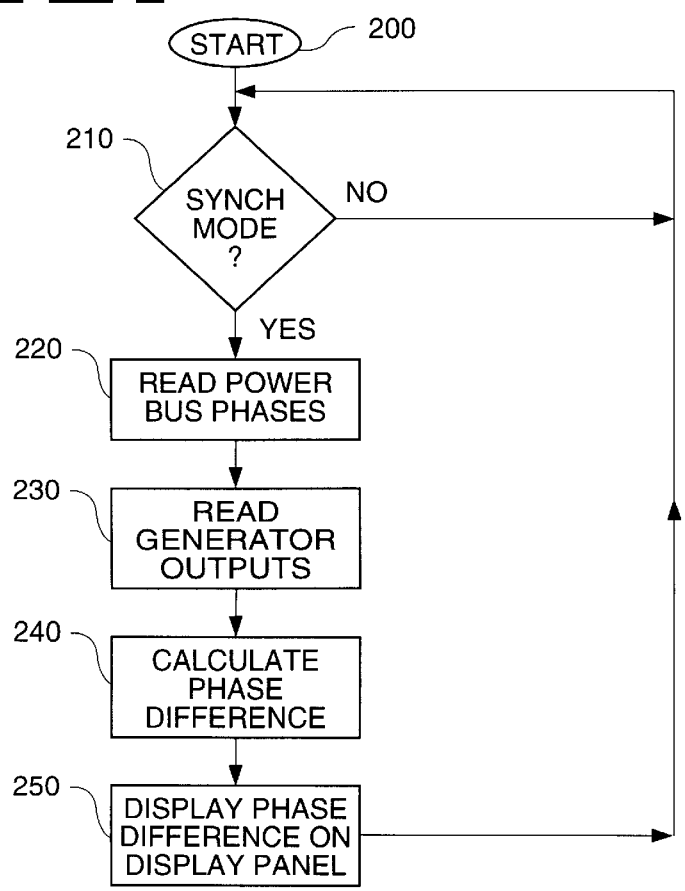
Fig-3-

GENERATOR SET CONTROLLER WITH INTEGRAL SYNCHROSCOPE MODE

TECHNICAL FIELD

The present invention generally relates to a generator set controller, and more particularly, relates to a generator set controller including an integral synchroscope mode.

BACKGROUND ART

An engine/generator combination is generically referred to as a generator set. One specific application for a generator set is to supplement the main power service for a facility. When using a generator set in this manner, it is necessary to start the engine, then synchronize the generator output to the phase, order, zero crossing and voltage of the power on the power bus to which the generator is connected. Used in this manner the generator set can supplement the power on the power bus during periods of peak demand from the manufacturing plant or facility. In order to synchronize the generator output with the power bus, a synchroscope is generally connected between the different phases of the power bus and the different corresponding phases of the generator output to display the phase difference between the two power supplies. Based on the synchroscope output, the operator can adjust the engine speed to modify the phase of the generator set output in an attempt to match the output phase of the generator with the phase of the power bus. When the two phases are within a predetermined tolerance of one another, and the voltages, order and zero crossings are all within their respective tolerances, the operator can connect the generator set to the power bus.

Although the synchroscope generally performs satisfactorily there are disadvantages associated with its use. First, it must be manually connected to the power bus and to the generator output each time it is used or, if it is connected permanently, then the resulting extra hardware increases the cost of the system. It would be preferable to have a generator controller that included a synchroscope mode.

DISCLOSURE OF THE INVENTION

The present invention includes a system for synchronizing a generator set output to a power bus. The system includes an electronic controller connected with an engine, a generator output, and a power bus. A display panel and a synchronization mode selector are connected with the electronic controller. The electronic controller calculates a phase difference between a voltage of the power bus and a voltage of the generator output, and produces an output signal to a display panel as a function of the phase difference when the synchronization mode selector has selected a synchronization mode.

Other aspects and advantages of the present invention will become apparent upon reading the following detailed description in connection with the drawings and appended claims

BRIEF DESCRIPTION OF THE DRAWINGS

FIG. 2 is a front view of a numeric display panel associated with a preferred embodiment of the present invention while operating in a synchroscope mode.

FIG. 2a is a front view of the numeric display shown in FIG. 2 while operating in a normal operating mode.

FIG. 3 is a flow chart of a preferred embodiment of the software control implemented in an electronic controller of an embodiment practicing the present invention.

BEST MODE FOR CARRYING OUT THE INVENTION

Figure 1:
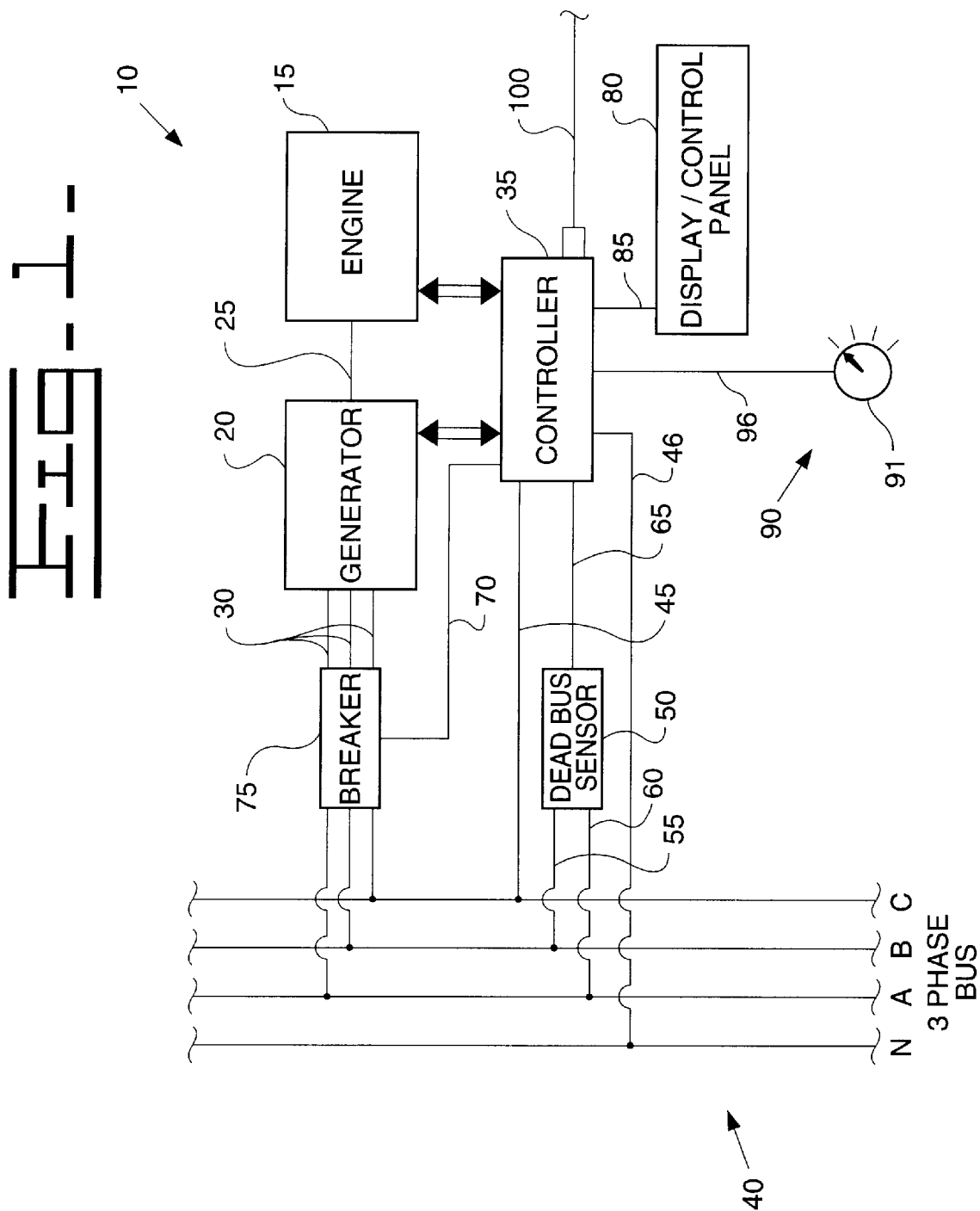
FIG. 1 is a block diagram of a generator set including a preferred embodiment of a generator controller of the present invention.

A preferred embodiment of the best mode of practicing the present invention is described herein. However, the present invention is not limited to this single embodiment. On the contrary, the present invention encompasses all alternative designs and equivalents as may fall within the scope of the appended claims.

Referring first to FIG. 1, a generator set 10 incorporating a preferred embodiment of the present invention is shown. The generator set 10 includes an engine 15 connected to a generator 20 through a driveshaft 25, a coupling (not shown), and other well known devices. The generator output 30 typically includes three phases of electrical current offset from one another by 120 degrees. A controller 35 is connected with both the engine 15 and generator 20 to sense, among other things, various engine and generator operating parameters. The controller 35 is also connected with an operator display panel 80 by a connector 85 and a synchronization mode selector 90 by a connector 96. In a preferred embodiment, the synchronization mode selector 90 includes a four position switch 91, but could include other types of switches, buttons or any other selector by which the operator can select between a plurality of different synchronization modes. Although FIG. 1 shows the synchronization mode selector 90 as distinct from display panel 80, it is possible to include the selector 90 on the display panel without deviating from the scope of the present invention.

Also preferably connected with the controller 35 is a data bus 100 or other similar connection mechanism to permit a remote computer or other similar device to download operating commands and instructions to the controller 35 and to upload operating parameters and data from the controller 35.

In an embodiment of the present invention, the generator 20 and the controller 35 are connected with a power bus 40. As shown in FIG. 1, a first phase C of the power bus 40 and a neutral wire N are connected with the controller 35 via connectors 45, 46 respectively. The neutral wire connector 46 is preferably connected with an AC ground input of the controller. As will be known to those skilled in the art, these connections may include filtering, signal conditioning, and other circuitry not shown in FIG. 1. A second phase B and a third phase A are connected with a dead bus sensor 50 over connectors 55 and 60. The dead bus sensor 50 senses that there is no power on the bus 40 (i.e., the bus is dead). Preferably, the dead bus sensor senses a voltage difference between the second phase B and the third phase A and outputs a live bus signal over connector 65 in response to the voltage potential between the second phase B and the third phase A being greater than a user programmable level. In a preferred embodiment, the dead bus sensor comprises a normally closed relay that opens a contact producing the live bus signal when the voltage difference between the second phase B and the third phase A exceeds a predetermined level. A normally closed relay is preferable because faults in the relay or in the wiring will generally produce an open signal. Since a normally open relay would produce an open signal to indicate a dead bus, it would be possible for the controller to misinterpret an open signal caused by a fault as a dead bus. Although a preferred embodiment of the present invention senses a voltage difference between the second and third phases, other phases could readily and easily be used and other forms of sensors could be used.

In some operating conditions, the controller 35 determines that the power bus 40 is dead (i.e., there has been an electrical failure and the utility is not providing power to the power bus 40). When the power bus 40 is dead, the controller produces a breaker signal on connector 70 which causes a breaker 75 to connect the generator output 30 to the first C, second B, and third A phase of the power bus 40. In this manner, the controller 35 is capable of automatically connecting the generator output to the dead power bus 40.

The synchronization mode selector 90 preferably includes four positions: 1) automatic synchronization; 2) semi-automatic paralleling; 3) permissive paralleling; and 4) off. When the synchronization mode selector is in one of the modes 1)–3) the generator controller 35 is in a synchronization mode. However, the controller 35 operates slightly differently in each of the positions 1)–3).One method of operating the generator set 101 is from a remote location through a databus 100 or other communication medium. If an operator issues a start engine command over the data bus 100 and the synchronization mode selector 90 is in the automatic position, then the controller 35 will wait until it receives a start synchronization signal over the databus 100 to begin automatically synchronizing the generator 20 out put to the power bus 40.

Other methods of synchronizing begin with an operator starting the engine 15 locally through a switch (not shown) or other operator control. In this case, when the synchronization mode selector 90 is in the automatic position, the controller determines whether the bus 40 is live and then begins to automatically synchronize the generator output 30 with the bus 40. Once the generator output is synchronized with the bus 40 then the controller issues a signal over connector 70 for a predetermined duration to cause the breaker 75 to close, thereby connecting the generator output 30 to the bus 40 for a predetermined time.

When the operator has started the engine 15 locally through the switch (not shown) or other operator control, and the synchronization mode selector 90 is in the semi-automatic paralleling position, the controller determines whether the bus 40 is live and then begins to automatically synchronize the generator output 30 with the bus 40. Once the generator output is synchronized with the bus 40 then the controller 35 will recognize a manual close breaker signal produced by an operator input (not shown) there by causing the controller to issue a signal over connector 70 to cause the breaker 75 to close and connect the generator output to the bus 40. Although the manual close breaker switch is not shown in FIG. 1, those skilled in the art could readily and easily connect such as witch to the controller 35. In another embodiment, the manual close breaker signal could be issued by a remote computer or other controller and received by the controller 35 over the data bus 100.

When the operator has started the engine 15 locally through the switch (not shown) or other operator control, and the synchronization mode selector 90 is in the permissive paralleling position, the controller 35 determines whether the bus 40 is live and then permits the operator to manually synchronize the generator output 30 with the bus 40. The operator manually synchronizes the generator output 30 with the bus 40 by monitoring the output of a synchroscope (described in more detail below) and slightly varying engine speed to cause the two power sources to be synchronized. Once the generator output is synchronized with the bus 40 then the controller 35 will recognize a manual close breaker signal produced by an operator input (not shown) there by causing the controller to issue a signal over connector 70 to cause the breaker 75 to close and connect the generator output 30 to the bus 40. Although the manual close breaker switch is not shown in FIG. 1, those skilled in the art could readily and easily connect such a switch to the controller 35. In another embodiment, the manual close breaker signal could be issued by are mote computer or other controller and received by the controller 35 over the data bus 100.

When the synchronization mode selector 90 is in any oft he modes 2) or 3), the controller 35 is in synchronization mode, and a display on the display panel 80 becomes a synchroscope as generally shown in FIG.2. In other normal operating modes, the display shows other operating parameters and conditions as shown generally by FIG. 2a. In a preferred embodiment, the display will show the power output 130 of the generator set on the left side of the display and will show a reading 135 of one of various engine parameters 140 on the right-hand side. In a preferred embodiment, the engine parameters include engine oil temperature 142, system battery voltage 144, engine hours 146, engine speed 148, engine oil pressure 150, and engine coolant temperature 152, left exhaust temperature 154, and right exhaust temperature 156. The value for one of these conditions is shown for two seconds and then the display scrolls to the value for the next condition. A small pointer 158 identifies the engine condition that corresponds to the value that is showing. When display control input (not shown) is pressed, the display stops scrolling and continuously shows a particular engine operating parameter as indicated by a pointer 158.

As shown in FIG. 2a, although a preferred embodiment displays these operating parameters, those skilled in the art will recognize that other operating conditions and parameters could be displayed without deviating from the scope of the present invention as defined by the appended claims. As shown in FIG. 2, the display 80 will preferably include a numeric panel 110 capable of displaying thirteen numeric characters. It will be obvious to those skilled in the art, however, that other types of display panels or those with a fewer or greater number of segments could be readily and easily used in connection with the present invention without deviating from the scope of the present invention as defined by the appended claims. When in synchroscope mode, the numeric display includes a ring of segments 115 outlining the periphery of the display. The panel 110 includes a symbol 120 or other indicator that rotates about the periphery to indicate the phase angle and frequency relationship between the bus 40 and the generator output 30. The display panel output and the relationship between the generator output 30 and the bus 40 is shown below in TABLE 1.

GSC+S Synchroscope—Frequency and Phase Angle Relationship

TABLE 1

| Pointer Position | Indication |
| --- | --- |
| Rotating clockwise | Frequency of the incoming generator is greater than bus. |
| Rotating counter-clockwise | Frequency of the incoming generator is less than bus. |
| Stopped, other than top center | Frequency of incoming generator and bus are same, out of phase. |
| Stopped at top center | Frequency of incoming generator and bus are |

TABLE 1-continued

| Pointer Position | Indication |
|---|---|
| | same, and in phase within the resolution of the display. |

Since a preferred embodiment of the invention includes a thirteen-character numeric display, it is capable of placing the symbol 120 in one of 26 distinct locations. If each of these locations is represented an equal phase difference between the power bus 40 and generator output 30, then the resolution of the display would be about 13.85° per position. Since it is desirable to have the phase of the two power sources be within a lesser tolerance before closing breaker 75, it is desirable in an embodiment of the invention to change the resolution of particular positions within the display 110. Since the phase difference is most important in the region where the phase differences are very small (i.e., where the phase of the generator output is close to the phase of the power bus), a preferred embodiment of the present invention uses a non-uniform mapping of the symbol position to the phase difference. In a preferred embodiment, the resolution around the zero degree phase difference is shown below, along with several other points:

| Position | Nominal Phase Diff | Resolution |
|---|---|---|
| 23 | 333.46 degrees | +/−5.17 degrees |
| 24 | 343.30 degrees | +/−4.68 degrees |
| 25 | 352.15 degrees | +/−4.18 degrees |
| 0 | 0.00 degrees | +/−3.67 degrees (best resolution) |
| 1 | 7.85 degrees | +/−4.18 degrees |
| 2 | 16.70 degrees | +/−4.68 degrees |
| 3 | 26.54 degrees | +/−5.17 degrees |
| . | . | . |
| . | . | . |
| . | . | . |
| 13 | 180.00 | +/−10.17 degrees (worst resolution) |

Although a preferred embodiment uses the foregoing map as the desired resolution, those skilled in the art will recognize that other resolutions could be used including finer resolution near the zero difference point accompanied by a coarser or decreased resolution at other points.

Referring now to FIG. 3, a flow chart of software control associated with a preferred embodiment of the invention is shown. Software implementation of the control shown in FIG. 3 can be readily and easily written by those skilled in the art using the instruction set for the particular micoprocessor used in controller 35. Such software implementation would be a mechanical step for those skilled in the art.

In block 200, program control begins. Program control then passes from block 200 to block 210. In block 210, the controller 35 reads the signal on connector 95 to determine whether the synchronization mode selector 90 is in one of positions 1)–3).If so, then the controller 35 is in a synchronization mode and program control passes to block 220. If not then program control enters a loop until the operator has selected a synchronization mode. Those skilled in the art will recognize that the flowchart shown in FIG. 3 describes only the operation of a preferred embodiment of the synchroscope operation of the present invention. Those skilled in the art will recognize that there are other operations that the controller 35 may perform concurrently with the flow chart or in other modes that are not required for a complete description of this invention.

In block 220, the controller reads the phase input data of the first phase C and control then passes to block 230.

In block 230, the controller reads the phase data of the generator outputs 30. Program control then passes to block 240.

In block 240, the controller calculates a phase difference between the first phase C of bus 40 and a corresponding phase of the generator output 30. Program control then passes to block 250.

In block 250, the display 110 displays the calculated synchronization data on the display 110. Program control then returns to block 210.

The foregoing description illustrates the advantages associated with an embodiment of the present invention. As noted abovea preferred embodiment includes an integral synchroscope function that displays the phase difference between the power bus and the generator output over an existing display on adisplay panel which isused to display other operating parameters when the controller is not in the synchroscope mode. Using this embodiment, the generator can be synchronized with a power bus without having to manually connect additional hardware to the generator and the bus.

What is claimed is:

1. A system for synchronizing a generator set output to a power bus, said system comprising:
   an electronic controller connected with an engine, a generator output, and a power bus;
   a numeric display panel connected with said electronic controller;
   a synchronization mode selector connected with said electronic controller;
   wherein said electronic controller calculates a phase difference between a voltage of said power bus and a voltage of said generator output, and produces an output signal to said display panel as a function of said phase difference when said synchronization mode selector has selected a synchronization mode; and
   wherein said numeric display forms a single ball, the position of the ball on said display in relation to an in phase position indicates the degree to which the power bus voltage and the generator output voltage are out of phase.

2. The system according to claim 1, wherein said display includes:
   a standard seven segment numeric display capable of displaying at least 13 numeric digits.

3. A display system for use with a generator set, said system including:
   a controller connected with a display, a power output of said generator set and a power bus;
   a display modes elector connected with said controller, said selector having at least two positions; and
   wherein said display shows generator set operating characteristics when said display mode selector is in a first position and shows a synchroscope output when said display mode selector is in a second position.

4. A display system according to claim 3, wherein said display mode selector includes a synchronization mode selector.

5. A display system according to claim 4, wherein said synchronization mode selector includes at least four positions including:

an automatic synchronization mode;

a semi-automatic paralleling mode;

a permissive paralleling mode; and an off mode.

6. A display system according to claim 5, wherein said display shows a synchroscope output when said synchronization mode selector is in a semi automatic paralleling mode or a permissive paralleling mode.

7. A display system according to claim 5, wherein said display shows generator set operating characteristics when said synchronization mode selector is in said off or said automatic synchronization positions.

8. A system for synchronizing a generator set output to a power bus, said system comprising:

an electronic controller connected with an engine, a generator output, and a power bus;

a display panel connected with said electronic controller, said display panel capable of alternatively displaying alphanumeric data indicative of generator set operating characteristics and graphically displaying a phase difference between the generator set output and the power bus;

a synchronization mode selector connected with said electronic controller; and wherein said electronic controller calculates a phase difference between a voltage of said power bus and a voltage of said generator output, and produces an output signal to said display panel as a function of said phase difference when said synchronization mode selector has selected a synchronization mode.

* * * * *